United States Patent [19]

Lantto

[11] Patent Number: 5,557,655
[45] Date of Patent: Sep. 17, 1996

[54] METHOD FOR ANALYZING SUBSCRIBER DATA RECEIVED FROM AN HLR IN GSM MSC/VLR

[75] Inventor: Sven J. Lantto, Tullinge, Sweden

[73] Assignee: Telefonaktiebolaget LM Ericsson, Stockholm, Sweden

[21] Appl. No.: 141,086

[22] Filed: Oct. 26, 1993

[51] Int. Cl.⁶ .................................................. H04Q 7/22
[52] U.S. Cl. .................................. 379/58; 455/33.1
[58] Field of Search ............................ 379/59, 60, 63, 379/58; 455/54.1, 33.1

[56] References Cited

U.S. PATENT DOCUMENTS

| | | |
|---|---|---|
| 4,644,351 | 2/1987 | Zebarsky et al. . |
| 4,700,374 | 10/1987 | Bini . |
| 4,752,951 | 6/1988 | Konneker . |
| 4,901,340 | 2/1990 | Parker et al. . |
| 5,090,050 | 2/1992 | Heffernan . |
| 5,353,331 | 10/1994 | Emery et al. .................. 379/58 |

FOREIGN PATENT DOCUMENTS

| | | |
|---|---|---|
| 454647 | 10/1991 | European Pat. Off. . |
| 9321715 | 10/1993 | WIPO ........................... 379/59 |

OTHER PUBLICATIONS

GSM Recommendation 09.02, Version 4.3.0, pp. 6-33—6-36.
Straw Man for Automatic Roaming, EIA, Jun. 1985, pp. 9-10, 18.
IN in Cellular Networks, Bijan Jabbari, Feb. 1992 p. 66 IEEE Communications Magazine.

*Primary Examiner*—Curtis Kuntz
*Assistant Examiner*—William G. Trost
*Attorney, Agent, or Firm*—Burns, Doane, Swecker & Mathis, L.L.P.

[57] ABSTRACT

A method of receiving in a GSM-network data for supplementary services in MSC/VLR which have been signalled via the protocol MAP between HLR and MSC/VLR. MAP contains sequences of "containers" for supplementary services, where respective "containers" always include a parameter that indicates the service to which the contents of a respective container relate, together with the data that varies from service to service. This parameter is always located in the same position internally within the "container". The method includes a function whose purpose is to analyze syntactically subscriber data received in MAP, to the extent that respective supplementary services can be identified. When the correct supplementary service has been identified with the aid of the data type SS-code, it obtains access to the contents of the container. Respective supplementary services analyze syntactically those data types that are included in the container in accordance with a structure which is known only in a respective supplementary service. Data is then stored locally for each supplementary service in MSC/VLR.

10 Claims, 3 Drawing Sheets

METHOD FOR ANALYZING SUBSCRIBER DATA RECEIVED FROM AN HLR IN GSM MSC/VLR

BACKGROUND

The present invention generally relates to cellular mobile radio systems based upon the so called GSM standard (GSM—Global System for Mobile communication), and more particularly to a method for receiving in a GSM network data for supplementary services.

A GSM network basically comprises at least one base station system BSS including a base station controller BSC and base station transceivers BTS. The GSM network furthermore includes a mobile services switching centre MSC, a home location register HLR and a visitors location register VLR.

Each subscribing mobile station MS belongs to a HLR in a home network, wherein permanent subscriber data is stored. When a mobile station is registered in a MSC/VLR as a new visitor, that mobile station's HLR sends a copy of the relevant subscriber data to MSC/VLR. The data is sent via the CCITT #7 network from HLR to MSC/VLR. The procedures for this are described in the protocol MAP (Mobile Application Part—specified in ETSI GSM recommendation GSM 09.02). The data structure in MAP is described generally in accordance with ASN.1 (Abstract Syntax Notation). ASN.1 and its rules are specified in CCITT X.208/X.209.

Subscriber data in MAP is found defined in a general data type referred to as SubscriberData. This data type is of the "constructed" type, which according to ASN.1 means that it, in turn, contains new data types. The data type in SubscriberData which relates to data for supplementary services is called ProvisionedSupplementaryServicesprovisionedSupplementaryServices is, in turn, an SS-infolist which, according to the data structure in MAP, means that it is comprised of four different data types:

ForwardingInfo

CallBarringInfo

CUG-information

SS-data

ForwardingInfo is a data type which describes call forwarding services in a general manner. CallBarringInfo is a data type which describes call barring services in a general way. CUG-information describes the more complicated data structure of a closed user group, while SS-data describes the data structure of other supplementary services that do not fall beneath any of the categories listed above.

In turn, these data types contain the data that is specific to respective supplementary services. For example, in the case of call forwarding services, there is a great deal of data which is common to these services, and consequently call forwarding data is generally described in ForwardingInfo. Thus, supplementary service data is to some extent general data, and to another extent data which is specific to a respective supplementary service.

The data types ForwardingInfo, CallBarringInfo and SS-data have one feature in common, which is that the first data type internally is the SS-code.

An SS-code is a data type which identifies a certain SS (Supplementary Service). Thus, all supplementary services in GSM are identified with the aid of an SS-code. An exception to this rule is the supplementary service CUG.

The aforesaid can be summarized more simply by saying that MAP contains sequences of what is here referred to as "containers" for supplementary service data. Respective "containers" always include a parameter which indicates the service to which the "container" content relates (this parameter is the "SS-code" in MAP), together with the data that varies from service to service. The parameter which identifies the intended service is always found in the same location internally within the "container", therewith enabling the data receiver to be identified in the same way, irrespective of the service entailed.

EP 454,647 describes the routing of calls made to mobile subscribers. The home exchange of the mobile subscriber maintains information which identifies the location of the mobile subscriber. When a call to a mobile is received in an interrogation exchange, the exchange requests from the home exchange information as to where the incoming call shall be routed. The home exchange, however, first asks the exchange where the mobile is assumed to be located to page the mobile. The result is reported to the home exchange, whereafter the home exchange informs the interrogation exchange of the location of the mobile.

U.S. Pat. No. 4,644,351 relates to the transmission of messages via a radio channel, from one of a plurality of fixed central locations with different coverage to remote units. Each remote unit is allocated a unique address and is connected to one of the central locations. When a message to a selected remote unit is accepted in a central location, it is stored in a paging site connected to the selected remote unit. The selected remote unit is localized by searching through a file which contains remote unit addresses together with the locations of those remote units which are not located in the area covered by their connected central locations. If the remote unit is not located in the radio covering area of the central location to which it is connected, the message and address are sent to the central location given in the address file.

U.S. Pat. No. 4,700,374 relates to mobile telephone localization. A plurality of mobile telephone exchanges supervise or monitor the presence of mobile telephone units in their own areas and are connected to a national centre. The national centre is able to receive queries concerning the location of mobile telephone units from each of the mobile telephone exchanges and transmit this information to all mobile telephone exchanges in the system, via a satellite. The information contained in the localizing information relates to the identity of the mobile telephone exchange and of the mobile telephone and is sent by the national centre to the mobile telephone exchange as an established query so as to enable the exchange to set-up a connection.

U.S. Pat. No. 4,752,951 describes a personal location system. A "PERSONAL LOCATION UNIT" includes "personal location units" and a base station. Information relating to subscriber locations is sent to a data base.

U.S. Pat. No. 4,901,340 relates to a technique which allows a roaming mobile telephone subscriber to receive a call directed to his home area while said subscriber is located in a foreign area outside his home area. The MTSO of the foreign area receives information to the effect that the subscriber in the foreign area wishes to receive calls directed to his home area. The subscriber is allocated a temporary directory number (TDN) for use in the foreign area.

U.S. Pat. No. 5,090,050 describes communication with radio telephones that belong to a radio telephone system when said telephones operate in another geographical area served by another radio telephone system. The radio telephone user sends via the telephone a signal which activates a database in the home system. The activation signal identifies the radio telephone and the other radio telephone system which serves the area in which the radio telephone is temporarily located. When receiving a call which is directed to the radio telephone, the database searches for the activation signal and the call is transferred to the other system via a land telephone line. Radio communication is then established between the other system and the radio telephone.

SUMMARY

The object of the present invention is to provide a general solution to the problem of receiving data for supplementary services in MSC/VLR that have been signalled via MAP between HLR and MSC/VLR. The solution shall enable new supplementary services to be incorporated in MSC/VLR, without influencing those functions that deal with the termination of the MAP-protocol in MSC/VLR.

According to the present invention, this object is achieved in a method of receiving in a GSM standard network data concerning supplementary services in MSC/VLR which have been signalled via a GSM recommended protocol MAP between HLR and MSC/VLR, where MAP contains sequences of "containers" for supplementary service data, where respective "containers" include a parameter identifying the service to which the content of the container relates, together with data varying between services, by a) analyzing syntactically subscriber data received in MAP for identifying respective supplementary services, b) allowing access for an identified supplementary service to the content of the container, c) making the respective supplementary service analyze syntactically those data types which are included in the container in accordance with a structure which is known only in the respective supplementary service, and d) storing data locally for each supplementary service in MSC/VLR.

A preferred embodiment of the invention comprises the following functional steps:

A) 1. analyzing syntactically the content of the data type SS-infolist, i.e. the list which identifies data types in MAP, in order to identify those containers that are included in the SS-infolist;

2. identifying the data type SS-code internally within respective containers;

B) 1. analyzing the value of the SS-code while securing that new SS-code values can be added without influencing the function that performs the analysis, a supplementary service being pointed-out each time the analysis is performed;

2. requesting from this supplementary service release of the content of the container for use by said supplementary service, and analyzing internally within said supplementary service said content.

3. repeating steps B1–2 until all containers have been gone through and all containers have been delivered to respective receiving supplementary services, while discarding containers which do not correspond to a supplementary service.

As before mentioned, the data structure in MAP is described generally in accordance with ASN.1 (Abstract Syntax Notation). According to the invention, data types described according to ASN.1 syntax can be implemented in MSC/VLR in a manner to enable new supplementary services to be added in MSC/VLR, which provide their own data types, without influencing those functions that deal with termination of the MAP-protocol in MSC/VLR.

BRIEF DESCRIPTION OF THE DRAWINGS

The invention will now be described more closely below with reference to the enclosed drawings, in which.

DETAILED DESCRIPTION

Figure 1:
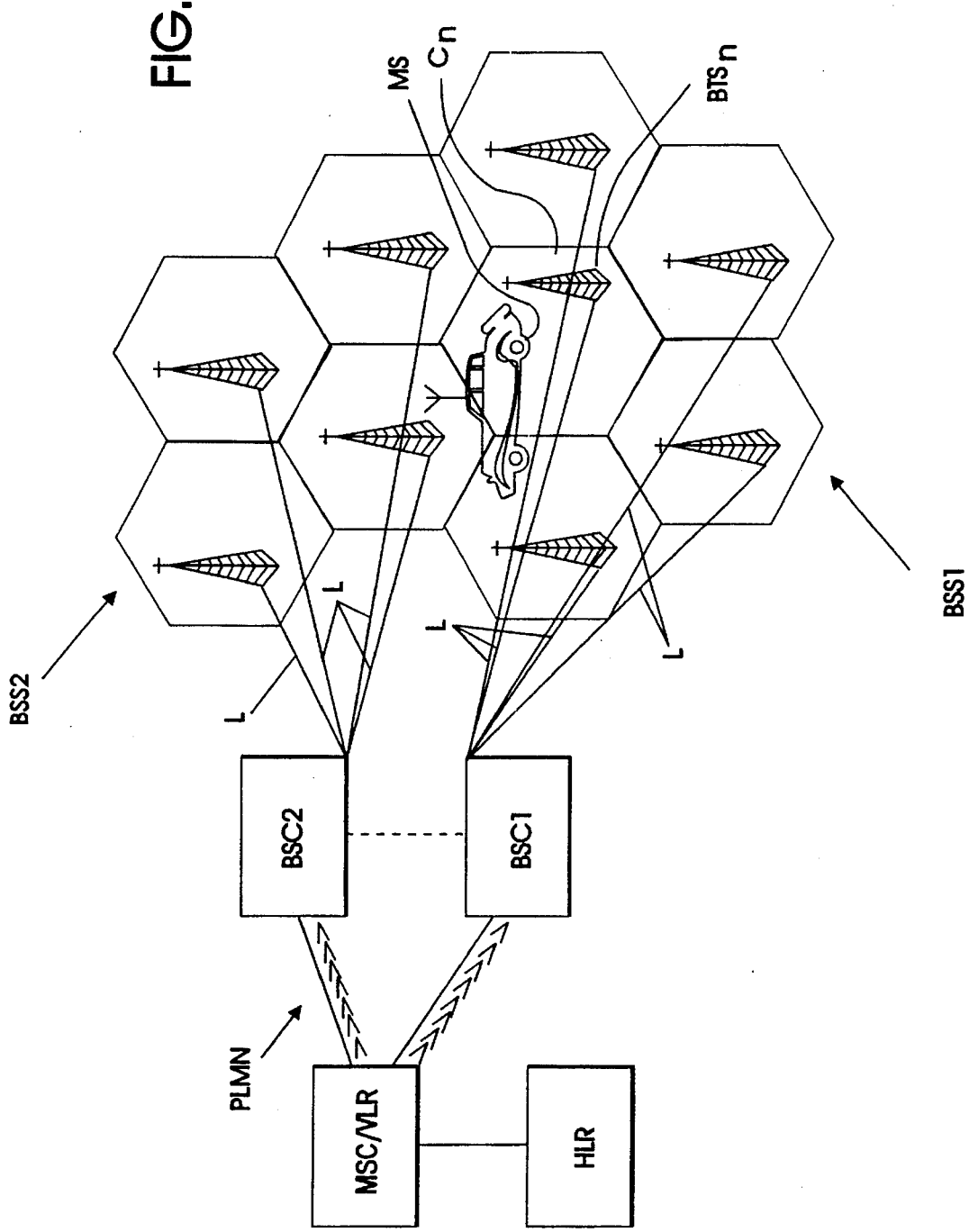
FIG. 1 is a schematic diagram illustrating the basic structure of a conventional GSM network, FIG. 2 schematically indicates a subscriber data information list relating to supplementary services, and FIGS. 3A–3B contain flowchart representations of one embodiment of the method according to the invention.

With reference to FIG. 1, a GSM cellular network basically comprises a number of base station systems, of which two are generally indicated at BSS1 and BSS2, respectively. Each of the base station systems BSS1 and BSS2 includes a base station controller BSC1 and BSC2, respectively, connected to base station transceivers BTS via communication links L, one of said base station transceivers being designated BTSn in FIG. 1. Each transceiver BTS is located in an associated cell of the cellular network, which is shown in FIG. 1 as a honeycomb structure wherein each hexagon represents a cell. In FIG. 1 the cell containing the transceiver BTSn is designated Cn. The GSM network furthermore includes a mobile services switching centre MSC having a visitors location register VLR. There are furthermore one or more home location registers HLR which communicate with the MSC. The MSC is connected for communication with the base station controllers BSC1 and BSC2 via a public land mobile network PLMN.

Although not shown, the MSC shown in FIG. 1 usually has an interface to other MSCs, each MSC having furthermore interfaces for connection to a local public switched telephone network.

Each subscribing mobile station MS belongs to a HLR in a home network, wherein permanent subscriber data is stored. When a mobile is registered in a MSC/VLR as a new visitor, HLR sends a copy of the relevant subscriber data to MSC/VLR. The data is sent via the CCITT #7 network from HLR to MSC/VLR. The procedures for this are described in the protocol MAP (Mobile Application Part—specified in ETSI GSM recommendation GSM 09.02). The data structure in MAP is described generally in accordance with ASN.1 (Abstract Syntax Notation). ASN.1 and its rules are specified in CCITT X.208/X.209, which is incorporated here by reference.

Subscriber data in MAP is found defined in a general data type referred to as SubscriberData. This data type is of the "constructed" type, which according to ASN.1 means that it, in turn, contains new data types. The data type in SubscriberData which relates to data for supplementary services is called ProvisionedSupplementaryServices. ProvisionedSupplementaryServices is, in turn, an SS-infolist. According to the data structure in MAP and with reference to FIG. 2 this means that the SS-infolist, designated 2, is comprised of four different data types 4, 6, 8, and 10, viz. CallBarringInfo, ForwardingInfo, SS-data, and CUG-information, respectively.

CallBarringInfo 4 is a data type which describes call barring services in a general way. ForwardingInfo 6 is a data type which describes call forwarding services in a general manner. CUG-information 10 describes the more complicated data structure of a closed user group, while SS-data 8 describes the data structure of other supplementary services that do not fall beneath any of the categories listed above.

The data types 4–10 contain the data that is specific to respective supplementary services. For example, in the case of call forwarding services, there is a great deal of data which is common to these services, and consequently call forwarding data is generally described in ForwardingInfo. Thus, supplementary service data is to some extent general data, and to another extent data which is specific to a respective supplementary service.

Figure 2:
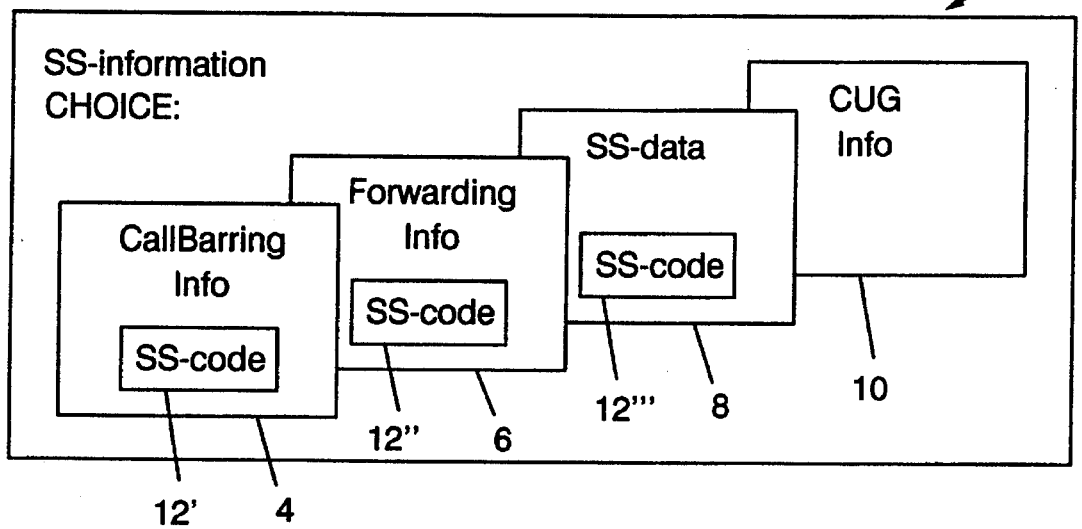

The data types ForwardingInfo, CallBarringInfo and SS-data have one feature in common, which is that the first data type internally is the so called SS-code, indicated at 12', 12" and 12'" in FIG. 2.

An SS-code is a data type which identifies a certain SS (Supplementary Service). Thus, all supplementary services in GSM are identified with the aid of an SS-code. An exception to this rule is the supplementary service CUG.

The aforesaid can be summarized more simply by saying that MAP contains sequences of "containers" for supplementary service data, i.e. containers 4–10. Respective "containers" always include a parameter which indicates the service to which the "container" content relates, this parameter being the "SS-code" in MAP, together with the data that varies from service to service. The parameter which identifies the intended service is always found in the same location internally within the "container" therewith enabling the data receiver to be identified in the same way, irrespective of the service entailed.

FIG. 2 is intended to illustrate the principle of using sequences of "containers" which is an important feature of the process according to the invention.

The invention implements a general function whose purpose is to analyze syntactically subscriber data that is received in MAP, to the extent that respective supplementary services can be identified. When the correct supplementary service has been identified with the aid of the data type SS-code, it is able to obtain access to the content of the "container". It is now up to respective supplementary services to analyze syntactically those data types that are included in the "container" in accordance with the structure which is known only in respective supplementary services. Data is stored locally for each supplementary service in MSC/VLR.

Figure 3B:
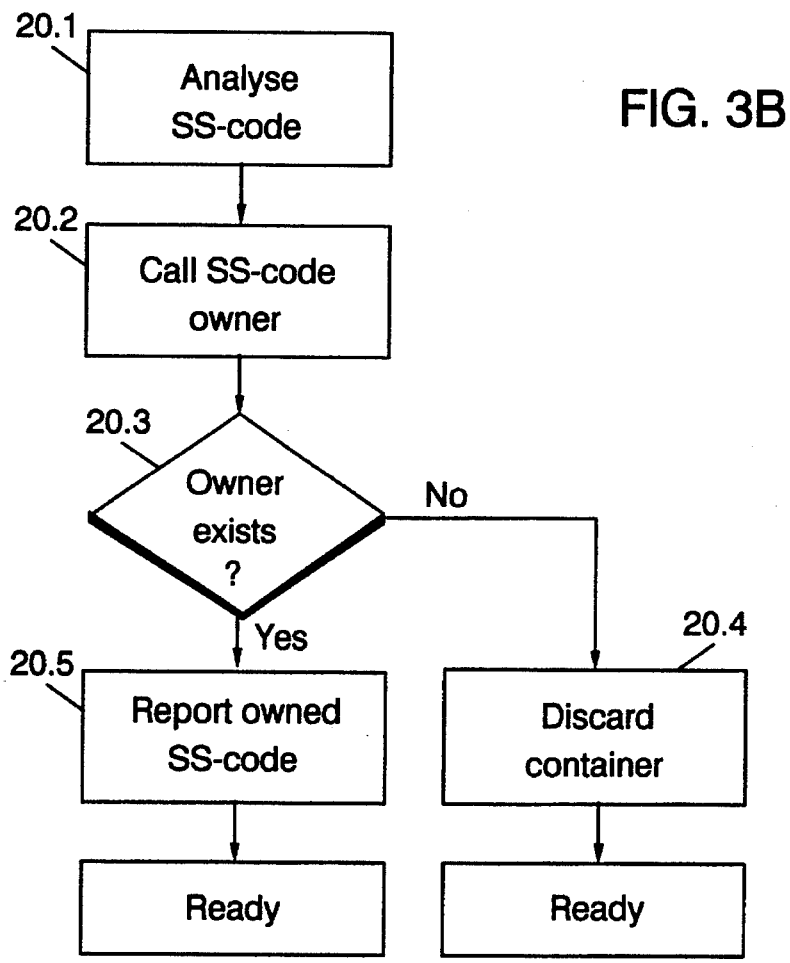
Figure 3A:
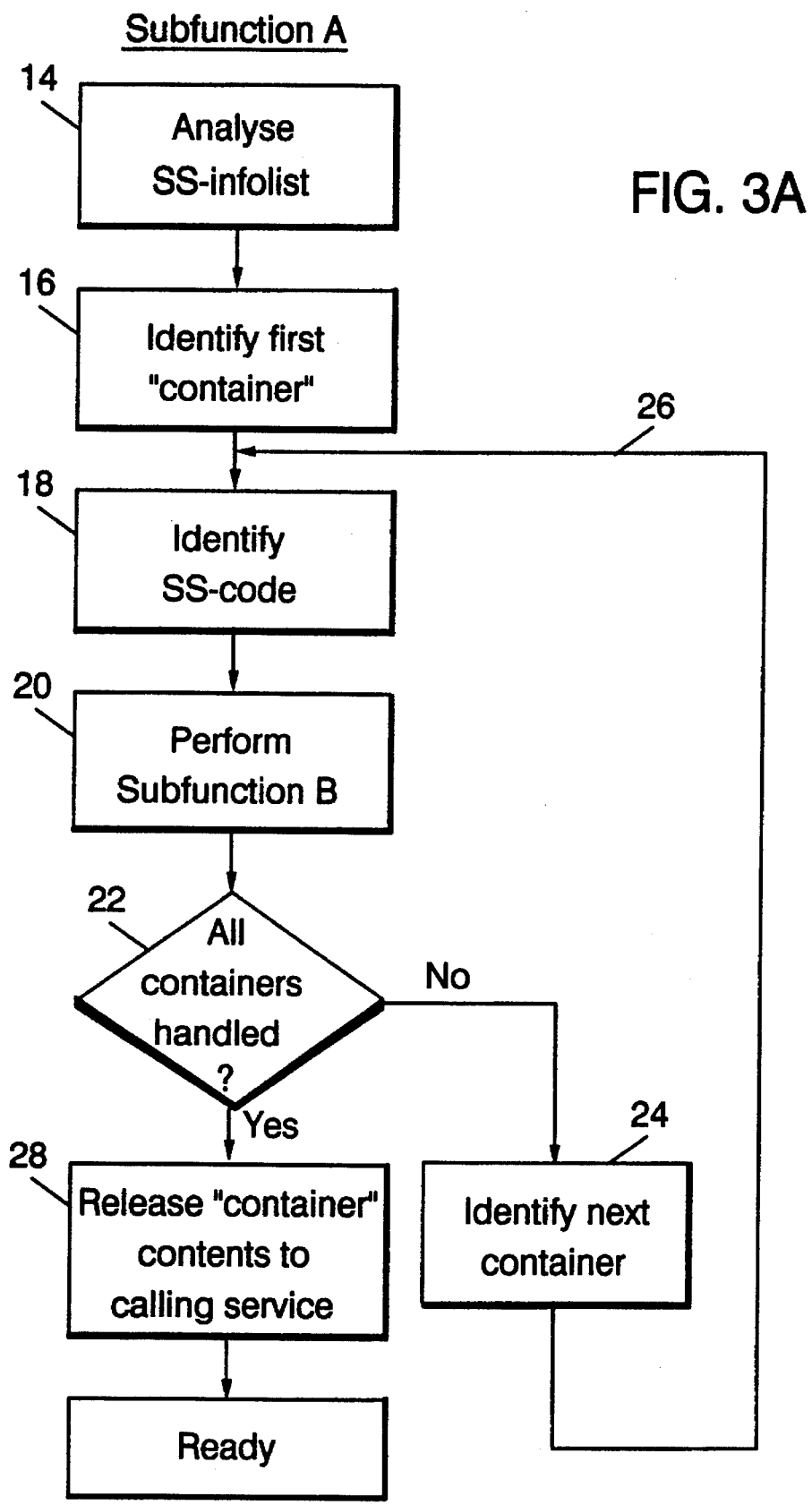

The function which resolves this in MSC/VLR is divided into two functions, here referred to as subfunction A and subfunction B, the procedural steps of which appear in FIGS. 3A–3B and below:

Subfunction A

Step 14—Analyze "SS-infolist".

Step 16—Identify first "container".

Step 18—Identify "SS-code".

Step 20—Perform subfunction B.

Step 22—Decide whether all containers have been handled.

Step 24—If no, identify next container and pass to step 18 according to arrow 26.

Repeat until all containers have been gone through as decided in step 22.

Step 28—Release the container contents when called from a "service".

Subfunction B

Step 20.1— Analyze "SS-code".

Step 20.2—Call the service that owns "SS-code".

Step 20.3—Establish whether there exists an owner

Step 20.4—If no, discard the "container".

Step 20.5—When called from a "service" store information relating to the service that owns respective "SS-code".

In subfunction A, the content of the data type SS-infolist is analyzed syntactically in step 14 so as to be able to identify all "containers" in the SS-infolist in step 16. The data type SS-code is identified internally within respective "containers" in step 18. The second subfunction, referred to here as subfunction B, is called-in for each "container" and performs, in step 20, to identify the correct supplementary service.

The subfunction B will analyze the value of the SS-code in step 20.1. This analysis is constructed so as to enable new values to be added to SS-code without influencing the function that carries out the analysis.

A supplementary service is pointed-out each time an SS-code is analyzed in step 20.1. This supplementary service is now able to call the subfunction A and therewith obtain access to the content, i.e. the data, in "its container" in step 28. The content of the "container" (the data types specific for this service) are now analyzed internally within the function for the supplementary service.

This procedure is now repeated according to steps 22, 24, until all "containers" have been gone through and all "containers" have been delivered to respective receiving supplementary services. Those "containers" which do not correspond to a supplementary service can be discarded, step 20.4, since these containers contain data for a service which is not implemented in MSC/VLR.

This general solution for receiving subscriber data for supplementary services in MSC/VLR enables the base function, which receives subscriber data, to be constructed in a manner which will enable new supplementary services to be added incrementally to MSC/VLR without needing to modify the base function.

This provides very good properties when constructing supplementary services, which are often optional for an MSC/VLR operator and each of which can thus be added without influencing the base functions in MSC/VLR, in this case with respect to receiving subscriber data from HLR.

In summary, the following procedural steps are to be carried out when working with and utilizing the service that owns SS-code:

When adding a new service in MSC/VLR, report "SS-code" to subfunction B by calling subfunction B, step 20.5.

When receiving a call from function B, call subfunction A, step 28 with a request for access to the content of the "container".

The nature of the software and hardware required to achieve the aforedescribed functions will be obvious to the person skilled in this art and need not therefore be described in more detail here.

What is claimed is:

1. In a network according to a Global System for Mobile communication (GSM) standard, a method of receiving data concerning supplementary services in a mobile services switching center/visitor location register (MSC/VLR) which have been signalled via a GSM recommended protocol mobile application part (MAP) between a home location register (HLR) and MSC/VLR, where MAP contains sequences of containers for supplementary service dam, where respective containers include a parameter identifying the supplementary service to which the content of the container relates, together with service specific data, comprising the steps of a) analyzing syntactically subscriber data received in MAP for identifying respective supplementary services, b) permitting access to the content of the container for an identified supplementary service, c) making the respective supplementary service analyze syntactically those data types which are included in the container in accordance with structures particular to the respective supplementary service, and d) storing data locally for each supplementary service in MSC/VLR.

2. A method according to claim 1, comprising the further step of using as said parameter a supplementary service code (SS-code) which is always found in the same location internally within said container.

3. A method according to claim 1, wherein the container content includes at least two data types and said method further comprising the steps of:

A) 1. analyzing syntactically the content of a data type supplementary service infolist (SS-infolist) which identifies data types in MAP, in order to identify those containers that are included in the SS-infolist;

2. identifying a data type supplementary service code (SS-code) internally within respective containers;

B) 1. analyzing a value of the SS-code such that new SS-code values can be added without altering the analysis, a supplementary service being identified each time the analysis is performed;

2. requesting from the identified supplementary service release of the content of the container for use by said supplementary service, and analyzing internally within said supplementary service said content;

3. repeating steps B1–2 until all containers have been gone through and all containers have been delivered to respective the MSC/VLR receiving supplementary services, while discarding containers which do not correspond to a supplementary service.

4. A method of receiving supplementary services data in a mobile switching center/visitor location register (MSC/VLR) from a home location register (HLR) in accordance with a Global System for Mobile (GSM) communications mobile application part (MAP) protocol, the method comprising the steps of:

analyzing a supplementary services code in a designated location in at least one of a plurality of containers contained within the MAP protocol;

granting access to contents of each of said plurality of containers which have a designated supplementary services code; and copying container data corresponding to said designated supplementary services code into a MSC/VLR.

5. The method as claimed in claim 4 wherein the method of analyzing the supplementary services code includes syntactically analyzing the content of a data type supplementary service infolist (SS-Infolist) which identifies data types in the MAP to identify those of the plurality of containers that are included in the SS-Infolist.

6. The method as claimed in claim 5 wherein the method further includes the step of:

identifying a data type supplementary service code (SS-code) internally within the plurality of containers.

7. The method as claimed in claim 6 wherein the method further includes the step of:

analyzing a value of the SS-code in such a way that new SS-code values can be added without altering the analysis.

8. The method as claimed in claim 7 wherein the method further includes the steps of:

identifying a supplementary service associated with the analysis of the value of the SS-code; and requesting from the release of contents of a container associated with the identified SS-code for use by said supplementary service.

9. The method as claimed in claim 8 wherein the method further includes the step of:

internally analyzing the content of the container associated with the supplementary service.

10. The method as claimed in claim 4 wherein the method is performed until all of the plurality of containers are analyzed, while containers corresponding to an identified supplementary service are copied and containers not corresponding to an identified supplementary service are discarded.

* * * * *

UNITED STATES PATENT AND TRADEMARK OFFICE
CERTIFICATE OF CORRECTION

PATENT NO. : 5,557,655
DATED : September 17, 1996
INVENTOR(S) : Lantto

It is certified that error appears in the above-indentified patent and that said Letters Patent is hereby corrected as shown below:

On the title page, after item [22] please insert:

[30]  Foreign Application Priority Data

Oct. 27, 1992 [SE]  Sweden . . . . . . . . . . . . . . . 9203143-4

Signed and Sealed this

Eighteenth Day of March, 1997

Attest:

BRUCE LEHMAN

*Attesting Officer*   Commissioner of Patents and Trademarks